No. 857,493. PATENTED JUNE 18, 1907.
F. SEDIVY.
POWER TRANSMISSION MECHANISM.
APPLICATION FILED DEC. 15, 1906.
2 SHEETS—SHEET 2.
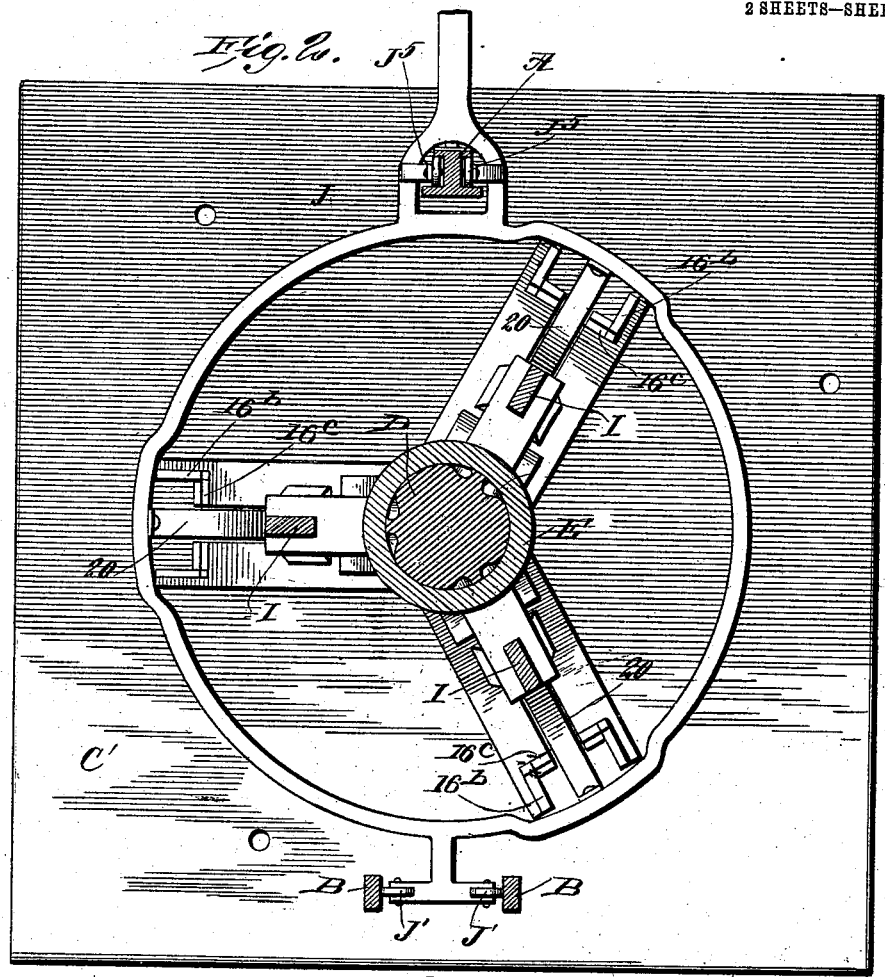
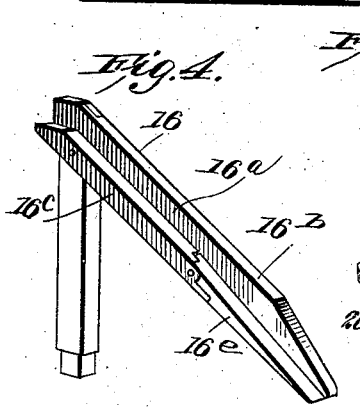
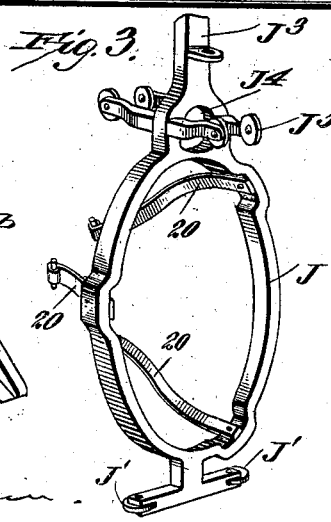
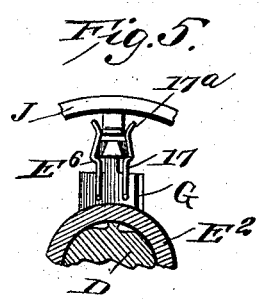
WITNESSES
E. M. Callaghan
Perry B. Turpin
INVENTOR
FRANK SEDIVY
BY Munn & Co.
ATTORNEYS

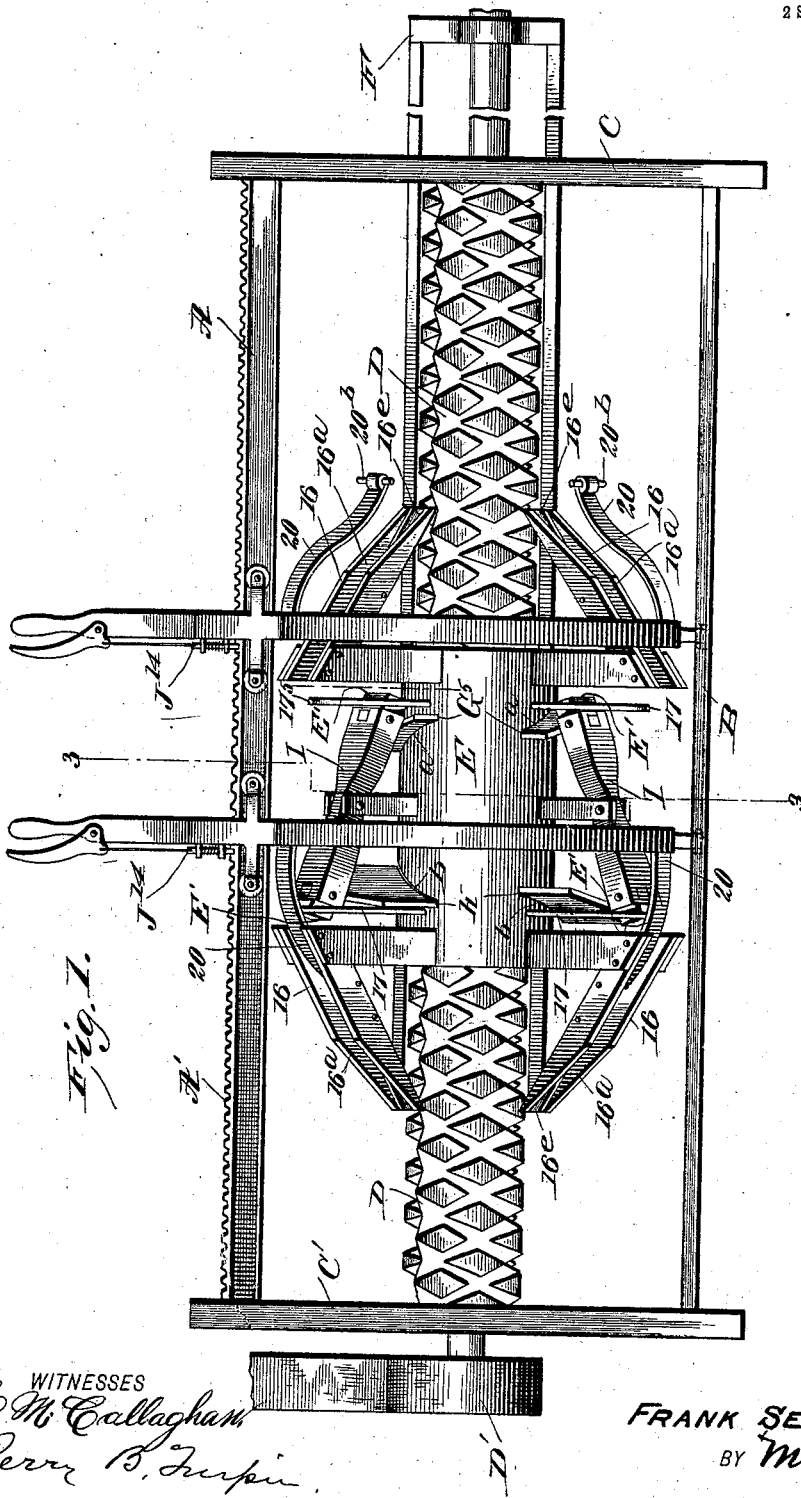

UNITED STATES PATENT OFFICE.

FRANK SEDIVY, OF GLOBE, ARIZONA TERRITORY.

POWER-TRANSMISSION MECHANISM.

No. 857,493.  Specification of Letters Patent.  Patented June 18, 1907.

Application filed December 15, 1906. Serial No. 348,039.

*To all whom it may concern:*

Be it known that I, FRANK SEDIVY, a citizen of the United States, and a resident of Globe, in the county of Gila and Territory of Arizona, have invented an Improved Power-Transmitting Mechanism, of which the following is a specification.

This invention is an improvement in power transmitting mechanism, and relates particularly to that class of such devices illustrated by my former patent No. 724,338, dated March 31, 1903, and the present invention has for an object among others to provide means whereby the stroke of the machine may be varied; and the invention consists in certain novel constructions and combinations of parts as will be hereinafter described and claimed.

In the drawings, Figure 1 is a side view of an apparatus embodying my invention. Fig. 2 is a cross section on about line 3—3 of Fig. 1. Fig. 3 is a detail perspective view of one of the carrier frames for the springs. Fig. 4 is a detail view of one of the guideways; and Fig. 5 is a detail cross section on about line 5—5 of Fig. 1, showing one of the restraining springs for the rocker.

The present apparatus is in many respects like that shown in my former patent above referred to, as I employ a suitable supporting frame, a screw journaled therein, and having independent intersecting and reversely inclined threadways, a traveler loosely slidable over the said screw and having means for interlocking with the screw consisting of automatically operating independent detents one for each threadway for alternately moving into and out of engagement with their respective threadways, whereby the traveler may be operated first in one direction and then in the other by the revolution of the screw continuously in the same direction. I also provide in the present construction trip devices comprising springs which operate to shift the detents of the traveler in the manner which will be more fully described hereinafter, and the present invention provides movable supports or carriers for the trip devices so they may be set to reverse the detent devices of the carrier at different points, and thus vary the stroke of the carrier.

In the present construction, I employ a frame having a top bar A, a bottom bar B, and end bars C and C', the latter having bearings for the screw D which is provided with reverse threadways as shown, and the traveler E is slidable along the screw D and connects with a cross head F, which may be connected in any suitable manner with any suitable device such for instance as an air compressor which it may be desired to operate by the reciprocal movement of the traveler E along the screw D.

The traveler E is in the form of a drum mounted upon the screw D, to freely slide thereon, and said traveler has a series of diagonal spirally disposed slots $a$, at one end, the pitches of which are in the direction of and parallel with the pitch of one set of threadways in the screw D, and the traveler also has a similar set of slots $b$ in its end, the pitch of which is reverse to that of the slots $a$ and in a plane parallel with the other threadways of the screw D, such construction being similar to the corresponding construction in my former patent, and for each of the slots $a$ and $b$, I provide detents G and H, which are carried at the opposite end of a rocker I which is pivoted between its ends so they may be rocked to set the detents G or the detents H into engagement with the screw D in the operation of the invention. In connection with this detent mechanism, I provide means for rocking the rockers I to reverse their position. In securing this result, I employ at the opposite ends of the carrier inclined guideways composed of opposing members 16 spaced apart to form a slotway $16^a$ between them, and each of the members 16 comprises a vertical or side guide flange $16^b$ and a horizontal guide member $16^c$, the lower portion of which horizontal guide member is in the nature of a part $16^e$ constructed and operating similar to the corresponding part in my former patent above referred to as best shown in Fig. 4 of the drawing, all of said construction being similar to corresponding parts in my former patent.

As shown best in Fig. 1, the upper end of each of the guideways terminates over one extremity of the walking beams or rockers I, and the ends E' of the walking beams are extended and coact with restraining springs 17—see Figs. 1 and 5—each of which is provided with a pair of spring fingers $17^a$ projecting radially from the traveler, and said spring fingers straddle the ends E' of the rockers I and have inwardly bent shoulders $E^6$ which slip under the ends of said rocker when said ends are swung outwardly to withdraw their respective detents from engagement with the screw, and thereby hold the said detents positively locked until they are again moved by the tripping mechanism into an operative position. The outer ends of the spring fingers 17$^a$ are disposed just under the ends of the slotted guideways. Spring arms 20 are suitably supported at one end and extend thence toward the adjacent ends of the main frame, and their free extremities are slightly upturned and are provided with lateral studs 20$^b$. These springs are so arranged that in one direction of movement of the traveler, the free ends of the springs ride in the slotways of the guides 16 with their studs 20$^b$ in engagement with the upper face of the guide parts 16$^e$, it being understood that by reason of the incline of the guides 16, the springs 20 will be constantly moved back under increased tension until the upper edges of the guides are reached, when by reason of the pressure on the springs 20 the free extremities will snap down back of the guides 16 and in their movement will first engage with and spread the spring fingers 17$^a$ and thereby free such end of the walking beam or rocker I, and the spring engaging such end of the rocker will force it inwardly to bring its detent into engagement with the screw D, the opposite end of the rocker being by this operation adjusted to free its detent from engagement with the screw, as will be readily understood. All of the foregoing will be found in my previous patent, and I have described the corresponding parts in the accompanying apparatus in accordance with the description of said former patent. In the construction shown in the said former patent, the springs 20 were secured to the frame and their positions were permanent.

By my present invention, I provide for adjusting the positions of the springs 20 so the stroke of the traveler E may be varied by reversing the rockers at different points, and I prefer to make the means for supporting the opposite sets of springs independent so they may be independently shifted to enable the reversing of the detent devices at any suitable position. In carrying out this feature of the present invention, I prefer to support the springs 20 on a carrier frame J in the form of a ring encircling the traveler E and the guide devices 16 at the ends thereof, and to secure the springs 20 to the carrier J so that they will be shifted by the movements of said carrier along the main frame. The carrier J is provided at its lower end with rollers J' operating between spaced apart base bars B, as best shown in Fig. 2, and also has a projecting handle J$^3$ and an opening J$^4$ at the base of said handle and through which the top bar A of the main frame projects. This top bar A has a rack A' engaged by a pawl J$^{14}$ carried by the handle J$^3$, and the opposite sides of the bar A are grooved longitudinally and receive the rollers J$^5$ connected with the carrier frame J as shown in Figs. 1, 2 and 3 of the drawings. By this construction it will be noticed the springs may be adjusted to and secured in any suitable position and will operate when so adjusted to reverse the traveler at corresponding points. The carrier frames supporting the opposite set of springs 20 it will also be noticed are independent of each other and may be conveniently set independently to any desired position and secured therein by their detents as described. The screw D may be turned by suitable belting applied to a pulley D' at one end of the screw, or the said screw may be turned by hand, or otherwise, as desired.

I claim:

1. A mechanism of the character described, comprising a screw having reversely inclined threadways, a traveler slidable over said screw and having means for interlocking with the threadways thereof and moving alternately into and out of engagement with their respective threadways, means for shifting said means interlocking with the threadways of the screw, and movable carriers for said shifting means whereby the latter may be set to reverse the device at different points, substantially as set forth.

2. The combination with the main frame the screw, the traveler movable thereon, the detents carried by said traveler for engaging the screw, and guideways on said traveler, of springs engaging at their free ends with said guideways and adapted to operate the detents of the traveler, and carrier frames to which the said springs are secured, said carrier frames being movable along the main frame, and means for securing the said carrier frames at different points along the main frame, substantially as set forth.

3. A power transmitting mechanism, comprising a screw having double threadways, a traveler movable along the screw and having means for engaging the threadways thereon, and the carrier frame movable along the main frame and having means for shifting the thread engaging means on the traveler, substantially as set forth.

4. The combination of the main frame, the screw journaled therein, and having reversely inclined threadways, the carrier movable along the screw, the rockers pivoted between their ends to the carrier and having at their opposite ends detents engaging the respective threadways of the screw, restraining springs for the opposite ends of said rockers, guideways terminating adjacent to said restraining springs, and carrier frames movable along the main frame and having springs operating in connection with the guideways and arranged to shift the rockers, substantially as and for the purposes set forth.

5. The combination with the main frame having the top bar provided with the rack and with the grooves in its opposite sides, of the screw journaled in the main frame, the traveler movable along the screw having means for engagement therewith, and carrier frames having springs for shifting the screw engaging means of the carrier and also provided with wheels or rollers running in the opposite grooves of the top bar of the main frame, and with pawls engaging with the rack of said top bar, substantially as set forth.

6. In an apparatus of the class described, the combination with a traveler operating means therefor and a main frame, of a carrier frame movable along the main frame and provided with means coöperating in reversing the stroke of the traveler, and means for securing the carrier frame in any desired adjustment, substantially as set forth.

7. The combination of a main frame, a screw journaled therein and having reversely inclined threadways, a traveler movable along the screw and having rockers and detents at the ends thereof for engaging with the respective threadways of the screw, inclined guideways at the opposite ends of the traveler, springs operating in connection with said guideways and adapted to shift the rockers of the traveler, and carriers for said springs, said carriers being movable along the main frame, substantially as set forth.

8. An apparatus substantially as described, comprising the main frame, a screw journaled therein and having reversely inclined threadways, a traveler movable along said screw and having means for engagement with said threadways, the means for engagement with one threadway being connected with those for engagement with the other threadway, whereby they may be alternately engaged with their respective threadways, and a carrier movable relatively to the main frame and having means for shifting the thread engaging devices of the carrier, substantially as set forth.

FRANK SEDIVY.

Witnesses:
    CHARLES P. BREITENSTEIN,
    KNIGHT PARKER.